United States Patent
Krishnamurthy

Patent Number: 5,956,027
Date of Patent: *Sep. 21, 1999

[54] METHOD AND APPARATUS FOR SHARING A WEB PAGE

[75] Inventor: Balachander Krishnamurthy, Chatham, N.J.

[73] Assignee: AT&T Corp, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/571,322

[22] Filed: Dec. 12, 1995

[51] Int. Cl.$^6$ ................................................. G06F 13/00
[52] U.S. Cl. .................................... 345/329; 709/218
[58] Field of Search ................................ 395/226, 227, 395/214, 793, 329–331; 345/329–332; 709/218, 203; 705/26, 27

[56] References Cited

U.S. PATENT DOCUMENTS

| | | | |
|---|---|---|---|
| 5,375,068 | 12/1994 | Palmer et al. | 364/514 |
| 5,450,590 | 9/1995 | Elko et al. | 345/330 |
| 5,539,886 | 7/1996 | Aldred et al. | 395/200.04 |
| 5,594,859 | 1/1997 | Palmer et al. | 395/330 |
| 5,617,565 | 4/1997 | Augenbraun et al. | 395/604 |
| 5,630,066 | 5/1997 | Gosling | 395/200.09 |
| 5,640,193 | 6/1997 | Wellner | 348/7 |
| 5,692,141 | 11/1997 | Kamisango et al. | 345/331 |
| 5,717,879 | 2/1998 | Moran et al. | 345/330 |
| 5,748,930 | 5/1998 | Prakash | 345/332 |
| 5,754,938 | 5/1998 | Herz et al. | 455/4.2 |

OTHER PUBLICATIONS

Que, Microsoft Office 6 In 1, pp. 591–593, 1994.
Que, Using Mosaic, pp. 236–238, 1994.
Balachander Krishnamurthy and Craig E. Wills, "Omicron: Events—Action", Dept. Computer Sciences, Purdue University, West Lafayett, IN 47907, Apr. 1986.
Andrea H. Skarra, "A Model of Concurrent, Cooperating Transactions In An Object–Oriented Database", MIT–JSME Workshop, MIT, Nov. 20–12, 1989: Proceedings, Sviram, Logcher, Fukuda, eds., Sprigner–Verlag, 19.
David S. Rosenblum, "Specifying Concurrent Systems with TSL", IEEE Software, May 1991, pp. 52–61.
Naser S. Barghouti and Balachander Krishnamurthy, "Using Event Contexts and matching Constraints to Monito Software Processes", 1995 IEEE 17th International Conference on Software Engineering, pp. 83–92.

*Primary Examiner*—Joseph H. Feild

[57] ABSTRACT

A method and apparatus for one user of the World Wide Web (WWW) to share an interesting WWW page with other users who have interest in the subject matter thereof. The user offers to share this WWW page by transmitting an announcement thereof. The other users have pre-arranged specifications stored in memory of their server(s) of what subject matter announcements will be accepted from which announcing users. Thus, the recipients can limit or filter the announcements of the URL's that they receive from others. If there is a match between the announcer's subject matter, perhaps the announcer's identity and/or employer's identity, and the recipient's specified acceptance criteria, then the server performing match up will take the action specified by the other user to be taken. Actions to be taken include load URL into WWW browser and download announced WWW page immediately for viewing, and store URL for later review.

13 Claims, 3 Drawing Sheets

METHOD AND APPARATUS FOR SHARING A WEB PAGE

TECHNICAL FIELD

The invention relates to computers and more particularly to a method and apparatus for one user to share a hypertext transfer protocol document, such as an http page received from a World Wide Web server site, with one or more other users.

DESCRIPTION OF THE PRIOR ART

The Internet is an international digital data network that interconnects digital equipment of various users, such as commercial companies, educational institutions, government branches and individuals. The World Wide Web is a part of the Internet network which communicates according to a standard hypertext transfer protocol, http. The World Wide Web is a very popular way of presenting and/or accessing information on a variety of topics. Computer servers that may be accessed via the World Wide Web are referred to as web sites. Typical organization of the information to be presented at a web site includes a home page which is a hypertext document that allows a user to interactively select the next page, which hopefully is one of a sequence of pages that lead to the information that the user desires to access. These pages often include graphics which means that many data bits must be transferred and much time or data bandwidth used for each page.

Each page has a Universal Resource Locator, URL, which is the predominate method of accessing a page. The usual procedure for searching out information at a web site is to access the web site's home page (or the one of interest if there are more than one on the server) and then make logical selections on the home page and successive hypertext pages to link to the information desired. If the search is fruitful, future access may be made directly to the desired page by entering the particular URL of the desired page. It is common for users with common subject matter interests to share URLs where such subject matter can be found. Sometimes a URL is shared by posting an article describing the subject matter to be found by use of a particular URL to a newsgroup generally related to such subject matter. Often interesting URLs are e-mailed from one user to another of similar interests notifying him or her of the location of the information. But, even if the URL is correct and still valid, i.e. the page has not been deleted or revised, the user that receives such a notification must still access the World Wide Web, manually type in the URL and wait for the page to be transferred over the Internet, which if the Internet is busy may be a considerable amount of time. Thus, there is need in the art for a faster, more direct method of sharing of WWW URLs and related information.

It is an object of this invention to provide a method and apparatus for a user to share a URL of a WWW users of similar interests.

It is another object of this invention to provide a method and apparatus for a user to share a web page with users of similar interests.

It is another object of this invention to provide a method and apparatus for a user to save the URL of a World Wide Web page for later browsing by the user and by other users.

SUMMARY OF THE INVENTION

Briefly stated, the aforementioned objects are achieved by providing a method for sharing a WWW page between users. This method includes having a WWW page that a first user wants to share with at least one other user. This WWW page is resident for display purposes in the user's client system but stored at a remote site. An event-action announcement is generated and transmitted to a server that is running an event-action program. The server running the event action program is able to understand the event-action announcement regarding the WWW page of interest. The server receives the announcement and consults interests of other users stored in memory. Each of the other users has previously declared an interest in receiving announcements regarding the subject matter, and specified the respective action to be taken by the server for each of the other users. After matching the announcement with the declarations and specifications, the server takes the action specified for each of the other users with respect to the announcement. The actions range from load the announced WWW page and display to store URL for future retrieval.

In accordance with another aspect of the invention, the foregoing objects of the invention are provided by an apparatus which provides the function of method described in the immediately preceding paragraph.

DETAILED DESCRIPTION

Figure 1:
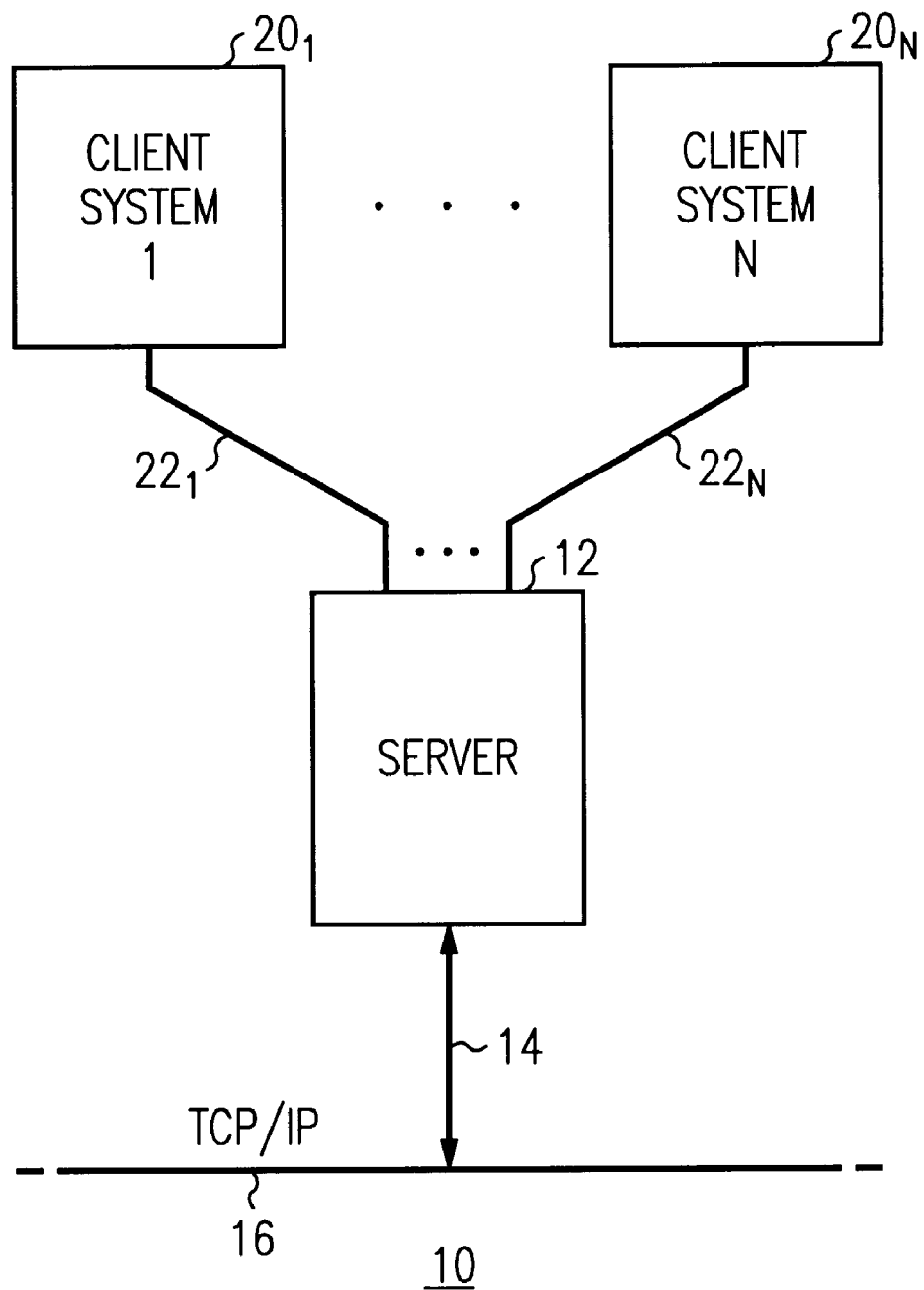
FIG. 1 is a block diagram of a WWW server serving a number of client systems for users.

Referring now to FIG. 1, a client-server arrangement 10 is shown. Server arrangement 10 has a server 12 which is connected via conductor 14 to a TCP/IP network 16. Server 12 is also connected to client systems $20_1$–$20_N$ via lines $22_1$–$22_N$. These client systems may be high powered personal computers or workstations that use graphical user interfaces for the World Wide Web, generally referred to as WWW browsers. When a user of client $20_1$ is using a WWW browser, the requests for WWW information typically are going through line $22_1$ to server 12 and out conductor 14 to TCP/IP conductor 16. The exception would be if server 12 were the WWW site that had the requested hypertext transfer protocol files. Since client systems $20_1$–$20_N$ should know what the URL of their local server is and what type of information is there, this exception will not be addressed and all data shall be considered to be requested from remote WWW sites via TCP/IP conductor 16.

The server 12 is running an event-action application such as YEAST, available from AT&T Bell Laboratories, which permits a user to specify event occurrences and constraints with the freedom provided to specify actions. An event-action application allows the coordination of operations of a computer system. In the present invention, this coordination of operations permits users to define both events to which the server will respond and actions which will be taken by the computer system in response to such events. The event-action application known as YEAST is described in the article YEAST: A General Purpose Event Action System, IEEE Transactions On Software Engineering, Vol. 21, No. 10, pages 845–857, by B. Krishnamurthy and D. Rosenblum, which is hereby incorporated by reference. YEAST is the preferred application for server 12 to support the method of the present invention.

Figure 2:
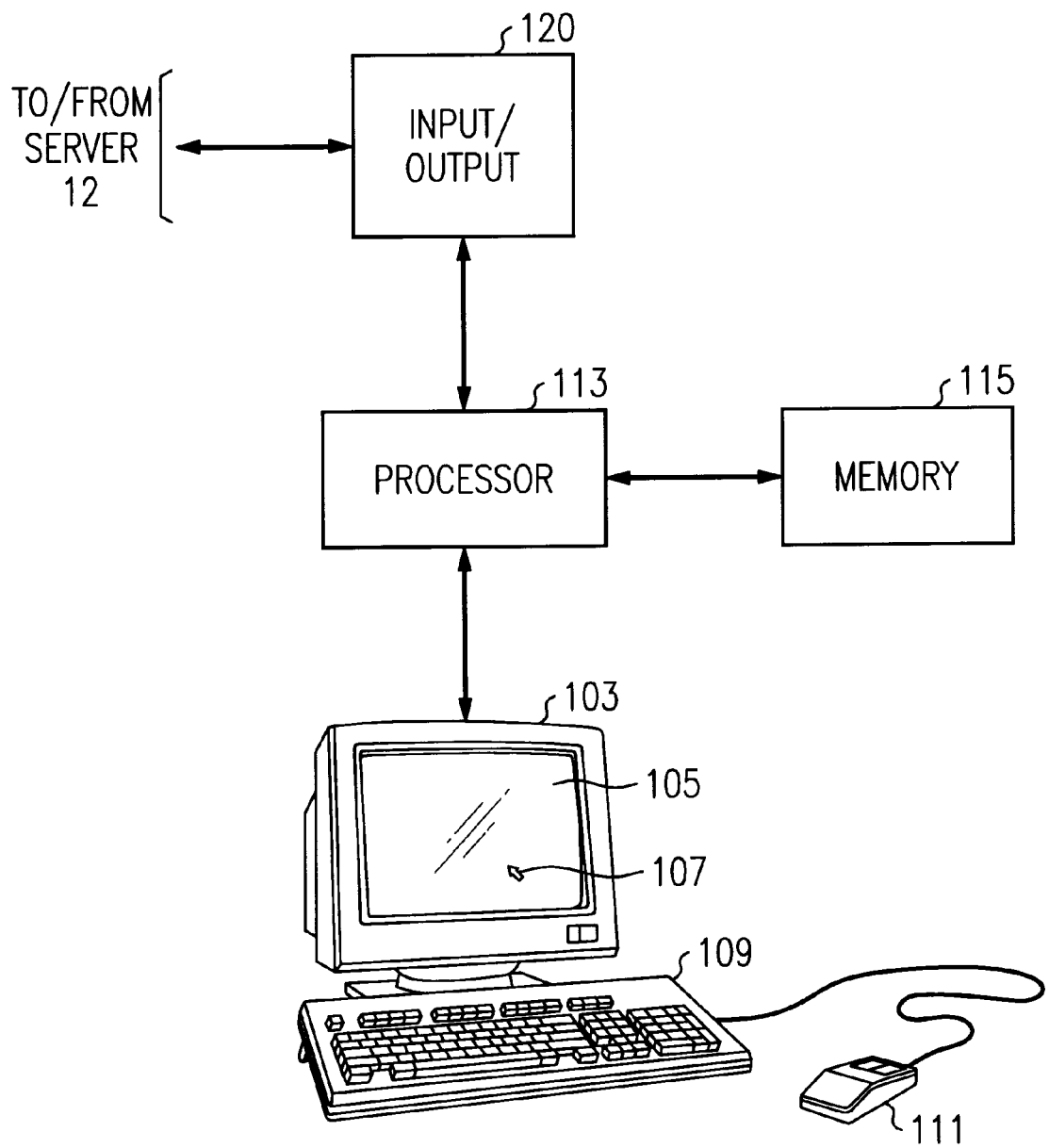
FIG. 2 is a block diagram for a client system.

FIG. 2 shows a representative client system $20_1$. Each user would either have a client system $20_1$ or its equivalent.

Client system $20_1$ has a display 103 with a screen 105. Screen 105 is where a WWW browser, such as WWW browser 200 of FIG. 3, would be displayed to the user of client system $20_1$. Client system $20_1$ also has a pointing device 111 that controls movements of a cursor 107 for interaction with user interface programs, such as WWW browser 200. The operation of WWW browsers, such as Netscape® and Mosaic®, are well known. In addition, the user of client system $20_1$ may interact with a WWW browser by means of keyboard 109. In support of all these user interface devices, client system $20_1$ has a processor 113 and memory 115 which process data and instructions to provide WWW browser functionality supplied by appropriate computer programs. Processor 113 also operates input/output unit 120 which is where the connection between client system $20_1$ and the rest of the world is made. Input/output unit 120 provides data transmission and reception with the server 12 (shown in FIG. 1).

Figure 3:
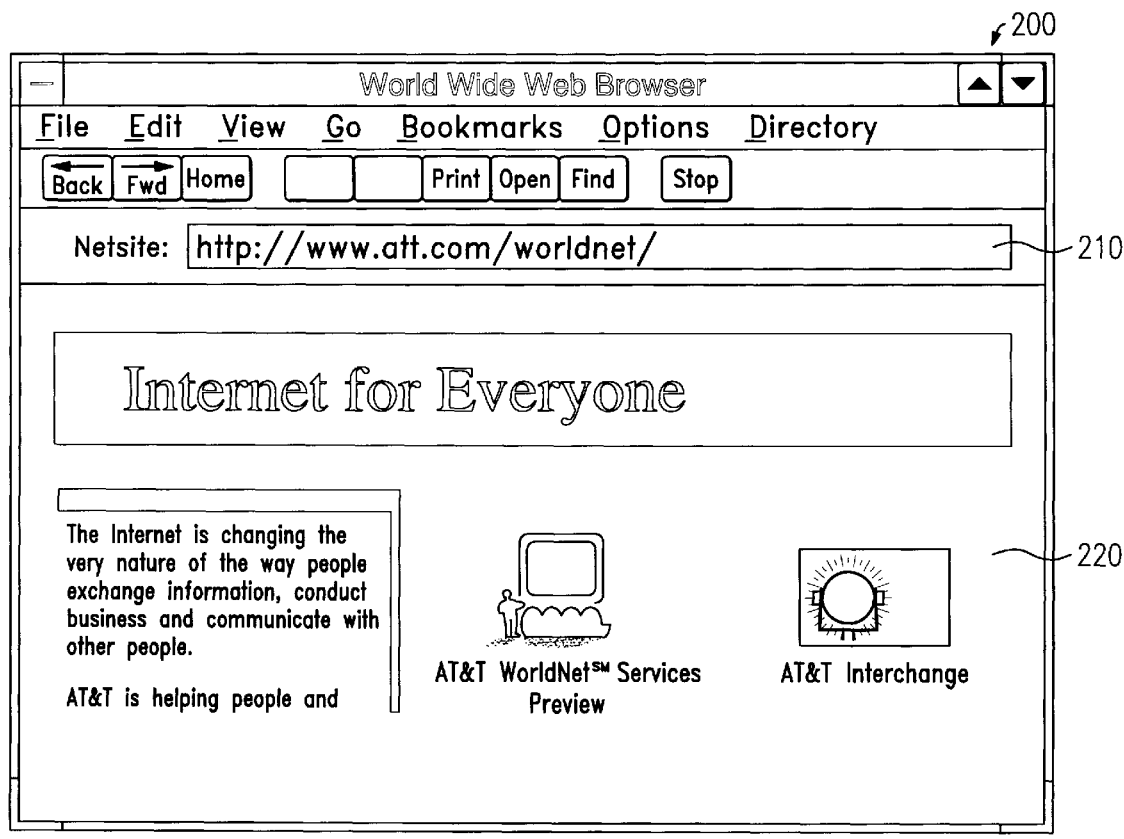
FIG. 3 is an illustration of a World Wide Web Browser with a URL shown.

Referring now to FIGS. 1 and 3, a user operating WWW browser 200 on client system $20_1$, or any other of the client systems $20_2$–$20_N$, can share a WWW page with other users having an interest in the information in the WWW page by the following procedure. The user who notices a WWW page of possible interest to the group of users, generates an event-action message, preferably a Yeast announcement. This message, e.g. announcement, is a notification generated as a packet of information to notify the server 12 with the corresponding URL of the WWW page. This is often performed manually by the user, but it should be noted that a Yeast announcement of this type may be generated automatically based on the occurrence of any number of events, such as the WWW page being updated. The form of the announcement generated by the URL recommender is as shown in the following two examples:

announce netscape travel url=http://www.jnto.go.jp/ announce netscape att url=http://www.att.com/.

Two Announcement Examples

Control of WWW page sharing is divided evenly on the announcer's part as well as on the part of each recipient. This is because the announcer probably does not want to share information with too many others. There is a human limit to how many other people one can know and make informed choices about whether to share information or not. Similarly, each recipient wants to limit the number of announcements for sharing WWW pages that are acted upon to a reasonable number. The recipient can limit whose announcements he or she will accept, what subject matter announcements to accept and even what subject matter announcements to accept from which announcers as a way to obtain high quality WWW page information and avoid information overload. Thus, each announcer determines to whom URL notifications should be sent and the recipient decides and declares (before the announcement) which announcements to accept from whom.

The announcement is directed to the central Yeast server 12 which receives it and ensures that the announcer is authenticated and authorized to send such an announcement to the set of recipients. Next, server 12 processes the set of recipients who have expressed interest in such announcements on a particular subject matter from this particular announcer. This processing is in essence a matching between the announcer and the subject matter on the sending side and the recipients' specifications of what subject matter will be received from which announcers. Each match triggers the corresponding actions recorded in their respective action specifications. A recipient/user may specify the action that his or her WWW browser be immediately changed to the announced URL, while another recipient/user may specify the action that the server 12 just log the information from the announcement, e.g. the URL, the sender's id, originating host etc. Thus, the sharing of a WWW page may either be concurrent or non-concurrent.

The interested recipient/user must provide a respective action specification before the announcement is sent. In Yeast, one of the forms of such an action specification may be:

addspec L: netscape att url!=x do gather % L:uid % % L:value %

The 'gather' script, (the set of commands which can be interpreted by a command interpreter), gathers the incoming URL and the user (uid) who sent the recommendation. It should be noted that in the first of the two announcements shown above, the 'travel url' does not match the specification made since the subscriber/recipient has only specified 'att'. Thus, the first announcement will not be gathered, i.e. it will be excluded, by the above action specification. It is possible however, both for the sender to send a partially or totally random URL and the recipient to gather it.

Alternately, a gather script could invoke 'netscape-remote' and jump to the URL argument of the announcement. This latter gathering procedure enables any set of users to browse and share WWW pages concurrently. This could be a very powerful collaboration or instruction/demonstration technique. It is worth noting that except for the transit delays times of communications and downloading times to a remote user, the sharing provided by the present invention can be between any set of users anywhere on the World Wide Web.

Thus, it will now be understood that there has been disclosed a system and method for sharing WWW pages among two or more users. While the invention has been particularly illustrated and described with reference to preferred embodiments thereof, it will be understood by those skilled in the art that various changes in form, details, and applications may be made therein. For example, as alluded to in the previous paragraph the users do not have to be connected to the same server, instead the announcing user can have his or her local server transmit the announcement to each recipient's remote server where it will be processed according to the Yeast action specification in each remote server, which may include processing as set forth above for the recipients connected to the local server. It is accordingly intended that the appended claims shall cover all such changes in form, details and applications which do not depart from the true spirit and scope of the invention.

What is claimed is:

1. A method for sharing a WWW page between users, comprising the steps of:

having a WWW page that a first user wants to share with at least one other user which is resident in a first client system;

generating an event-action announcement;

transmitting said event-action announcement to a server running an event-action program which can understand said event-action announcement;

said server receiving said announcement;

said server compares a subject matter of the announcement with interests of other users in the subject matter of said WWW page for a match; and after said comparison, said server triggers the respective actions specified to be taken by said server for each of the other users who were matched, said comparison enabling sharing of the WWW page to be concurrent or non-concurrent as selected by any of the users.

2. The method of claim 1, further comprising the step of:

authenticating said first user who transmitted the announcement as authorized to submit said event-action announcement.

3. The method of claim 1, wherein said action specified is to transmit the URL to a web browser of at least one of said other users and said web browser accesses the WWW page corresponding to the URL.

4. The method of claim 1, wherein said action specified is to store the URL for later entry to a web browser of at least one of said other users and said web browser accesses the WWW page corresponding to the URL.

5. The method of claim 1, wherein said event-action announcement is generated manually by said first user.

6. The method of claim 1, wherein said event-action announcement is generated automatically once said first user has decided to share the WWW page.

7. The method of claim 1, wherein said event-action announcement is generated automatically if the content of said WWW page changes.

8. The method of claim 1, wherein said event-action announcement is a packet of information in a specific format.

9. The method of claim 1, wherein said event-action announcement contains a URL of said WWW page.

10. The method of claim 1, wherein said event-action announcement is a Yeast command known as announce.

11. The method of claim 1, further comprising the step of:

for each of said other users, respectively authenticating said first user who transmitted the announcement as authorized to submit said event-action announcement to the respective user.

12. An apparatus for sharing WWW pages among a plurality of users, comprising:

a first client system having a WWW page resident therein that is to be shared with at least one other client system;

said WWW page having a URL;

a server running an event-action program which can process an event-action announcement including said URL;

said client system generating an event-action announcement announcing said WWW page and transmitting said event-action announcement to said server;

said server receives said announcement and compares a subject matter of said announcement with information from a set of other users that have interests in the subject matter of said announcement; and upon a true comparison, said server taking the respective action specified for each of the other users, said comparison enabling sharing of the WWW page to be concurrent or non-concurrent as selected by any of the users.

13. The apparatus of claim 12, wherein the respective action specified is forwarding said URL of said WWW page to a respective other user for entry into a web browser thereof and subsequent display of said WWW page.

* * * * *